(12) United States Patent
Cheong et al.

(10) Patent No.: US 11,415,212 B2
(45) Date of Patent: Aug. 16, 2022

(54) HYDRAULIC TRANSMISSION ASSEMBLY

(71) Applicant: LS MTRON LTD., Anyang-si (KR)

(72) Inventors: Seung Ho Cheong, Anyang-si (KR);
Jang Hyun Kim, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 17/054,880

(22) PCT Filed: Mar. 25, 2019

(86) PCT No.: PCT/KR2019/003413
§ 371 (c)(1),
(2) Date: Nov. 12, 2020

(87) PCT Pub. No.: WO2019/231091
PCT Pub. Date: Dec. 5, 2019

(65) Prior Publication Data
US 2021/0222774 A1    Jul. 22, 2021

(30) Foreign Application Priority Data

May 29, 2018  (KR) .................. 10-2018-0061262

(51) Int. Cl.
*F16H 57/021* (2012.01)
*F16H 57/02* (2012.01)

(52) U.S. Cl.
CPC ... *F16H 57/021* (2013.01); *F16H 2057/0216* (2013.01); *F16H 2057/02056* (2013.01);
(Continued)

(58) Field of Classification Search
CPC . F16H 2057/02056; F16H 2057/02086; F16H 2057/02095; F16H 57/021; F16H 2057/0216
See application file for complete search history.

(56) References Cited

U.S. PATENT DOCUMENTS 5,544,547 A * 8/1996 Ishimaru ................ B60K 17/04
74/15.82
5,913,950 A * 6/1999 Matsufuji .............. B60K 17/04
74/730.1
(Continued)

FOREIGN PATENT DOCUMENTS

JP    H10217782 A    8/1998
JP    2000018366 A    1/2000
(Continued)

OTHER PUBLICATIONS

International Search Report for related International Application No. PCT/KR2019/003413; action dated Jun. 28, 2019; (5 pages).
(Continued)

*Primary Examiner* — Michael Leslie
*Assistant Examiner* — Matthew Wiblin
(74) *Attorney, Agent, or Firm* — K&L Gates LLP (57) ABSTRACT

The present disclosure relates to a hydraulic transmission assembly comprising: a hydraulic transmission for performing speed shifting for the power generated by an engine; a pump shaft connected to the pump; a motor shaft connected to the motor; a sub speed-shift shaft connected to the pump shaft and/or the motor shaft through a plurality of speed-shift gears; a mounting main body having a mounting space for the hydraulic transmission; a speed-shift case having an accommodation space for the sub speed-shift shaft, and coupled to the mounting main body; and a cover part coupled to the mounting main body so as to cover the mounting space, wherein the cover part is coupled to the mounting main body such that at least a portion thereof is accommodated in the mounting space, and provides support power to one side of the sub speed-shift shaft.

8 Claims, 5 Drawing Sheets

(52) U.S. Cl.
CPC ............ *F16H 2057/02086* (2013.01); *F16H 2057/02095* (2013.01)

(56) References Cited

U.S. PATENT DOCUMENTS

| | | | |
|---|---|---|---|
| 7,404,341 B2* | 7/2008 | Nishino | B60K 17/08 74/331 |
| 2010/0051410 A1* | 3/2010 | Iwaki | F16H 47/04 192/221 |

FOREIGN PATENT DOCUMENTS

| | | | |
|---|---|---|---|
| JP | 2005016562 A | 1/2005 |
| JP | 2009127669 A | 6/2009 |
| KR | 19980065370 A | 10/1998 |
| KR | 20060050890 A | 5/2006 |
| KR | 20100026975 A | 3/2010 |

OTHER PUBLICATIONS

Written Opinion for related International Application No. PCT/KR2019/003413; action dated Jun. 28, 2019; (5 pages).

* cited by examiner

HYDRAULIC TRANSMISSION ASSEMBLY

CROSS-REFERENCE TO RELATED APPLICATIONS

The present application is a National Stage of International Application No. PCT/KR2019/003413 filed on Mar. 25, 2019, which claims the benefit of Korean Patent Application No. 10-2018-0061262 filed on May 29, 2018, with the Korean Intellectual Property Office, the entire contents of each hereby incorporated by reference.

FIELD

The present disclosure relates to a hydraulic transmission assembly accommodating a hydraulic transmission used for traveling of a vehicle.

BACKGROUND

Agricultural working vehicles are used to cultivate crops, which are required for human life, using soil. For example, combines, tractors, and the like belong to the agricultural working vehicles. The combines reap and thresh crops such as rice, barley, wheat, and beans. The tractors perform work required to cultivate crops using traction force. Hydraulic transmission assemblies are used for the agricultural working vehicles to work or travel.

Figure 1:
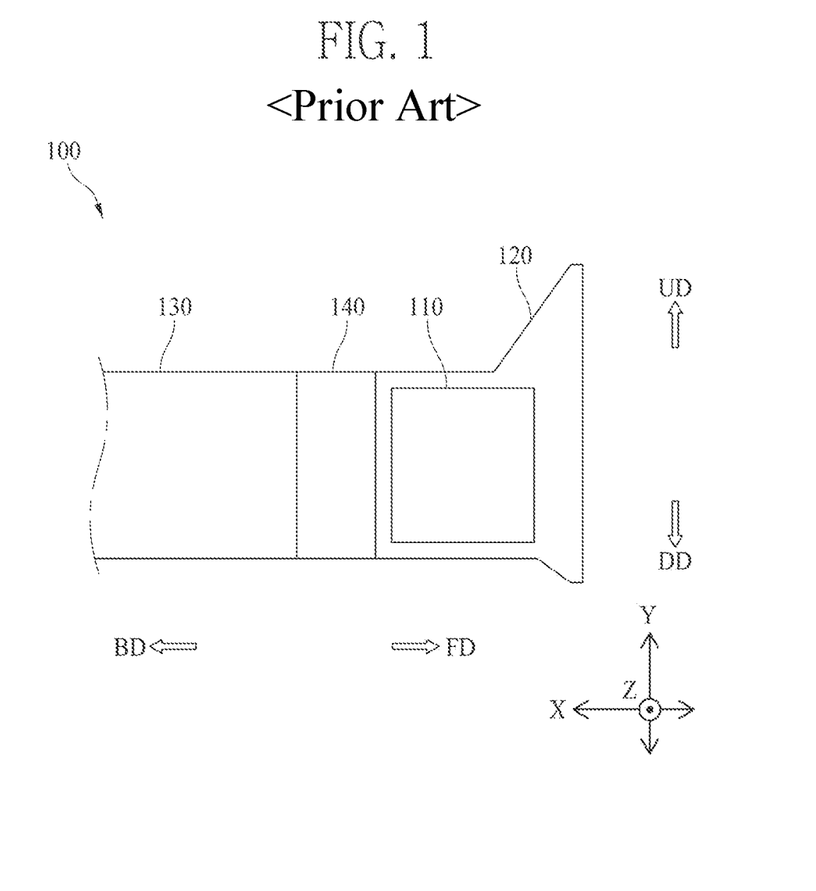
FIG. 1 is a conceptual schematic view illustrating a hydraulic transmission assembly according to a conventional art.

FIG. 1 is a conceptual schematic view illustrating a hydraulic transmission assembly according to a conventional art.

Referring to FIG. 1, a hydraulic transmission assembly 100 according to the conventional art includes a hydraulic transmission 110, a mounting main body 120, and a speed-shift case 130.

The hydraulic transmission 110 is used to adjust a torque, a speed, and the like during work and traveling of a vehicle as necessary. The hydraulic transmission 110 may perform speed-shift work of the vehicle by adjusting a torque, a speed, and the like generated by power supplied from a power source such as an engine. A working fluid such as oil is injected into the hydraulic transmission 110 to be operated. The hydraulic transmission 110 performs the speed-shift work of the vehicle using a hydraulic pressure of the working fluid.

The mounting main body 120 is for the hydraulic transmission 110 to be installed. The mounting main body 120 may accommodate the hydraulic transmission 110 therein. The mounting main body 120 may function as a housing of the hydraulic transmission 110.

The speed-shift case 130 is for accommodating a plurality of speed-shift gears (not shown). A sub-speed-shift shaft (not shown) may be accommodated in the speed-shift case 130. The plurality of speed-shift gears are installed around the sub-speed-shift shaft. The sub-speed-shift shaft may receive power from the hydraulic transmission 110 to be rotated so that sub-speed-shift work may be performed.

In this case, in the hydraulic transmission assembly 100 according to the conventional art, a support partition wall 140 is additionally disposed between the mounting main body 120 and the speed-shift case 130 to support the sub-speed-shift shaft accommodated in the speed-shift case 130. The support partition wall 140 is coupled to the mounting main body 120 and the speed-shift case 130. Accordingly, the sub-speed-shift shaft is not inclined in forward and backward directions (an X-axis direction) and is rotatable in the speed-shift case 130. The forward and backward directions (X-axis direction) are parallel to the forward direction (arrow direction FD) from the speed-shift case 130 toward the mounting main body 120 and the backward direction (arrow direction BD) from the mounting main body 120 toward the speed-shift case 130.

As described above, since the additional support partition wall 140 is implemented to be disposed between the mounting main body 120 and the speed-shift case 130, the hydraulic transmission assembly 100 according to the conventional art has a long length in the forward and backward directions (X-axis direction). Accordingly, in a case in which the hydraulic transmission assembly 100 according to the conventional art is installed in an agricultural working vehicle, since the hydraulic transmission assembly 100 has a large volume in the forward and backward directions (X-axis direction), spatial utilization of the agricultural working vehicle is reduced, and thus, a length of an entire power transmission passage through which power is transmitted from the hydraulic transmission 110 is increased so that there is a problem in that a degree of loss is increased during power transmission.

BRIEF SUMMARY

Therefore, the presently disclosed solution is designed to solve the problems and to provide a hydraulic transmission assembly which does not include an additional support partition wall to support a sub-speed-shift shaft.

To solve the above problems, the presently disclosed solution may include the following configurations.

A hydraulic transmission assembly according to the present disclosure may include a hydraulic transmission configured to perform speed-shift with respect to power generated by an engine using a pump and a motor; a pump shaft connected to the pump and rotated by power transmitted from the pump; a motor shaft connected to the motor and rotated by power transmitted from the motor; a sub-speed-shift shaft connected to at least one of the pump shaft and the motor shaft through a plurality of speed-shift gears; a mounting main body in which a mounting space is formed to install the hydraulic transmission; a speed-shift case in which an accommodation space is formed to accommodate the sub-speed-shift shaft and which is coupled to the mounting main body; and a cover part coupled to the mounting main body to cover the mounting space, wherein the cover part may be coupled to the mounting main body so that at least a portion thereof is accommodated in the mounting space and provide support power to one side of the sub-speed-shift shaft.

A hydraulic transmission assembly according to the present disclosure can have the following effects.

First, according to the present disclosure, since one side of a sub-speed-shift shaft is implemented to be supported by a cover part, the sub-speed-shift shaft can be supported thereby even without additionally providing a support partition wall between a mounting main body and a speed-shift case. Accordingly, in the present disclosure, a structure for supporting the sub-speed-shift shaft is simply implemented when compared to a conventional art in which a support partition wall is disposed between a mounting main body and a speed-shift case. Accordingly, the number of total assembly processes can be decreased so that an assembly cost and an assembly time can be reduced and maintenance work such as replacement and repair can also be further facilitated.

Second, according to the present disclosure, since the cover part is coupled to the mounting main body such that at least a portion of the cover part is accommodated in a mounting space, a length of a hydraulic transmission assembly can be decreased in forward and backward directions. Accordingly, in a case in which the hydraulic transmission assembly according to the present disclosure is installed in a vehicle body, an occupied volume therein in the forward and backward directions (X-axis direction) is decreased, spatial utilization of the vehicle body is improved, and thus, a length of an entire power transmission passage through which power is transmitted from a hydraulic transmission is decreased so that a degree of loss occurring while the power is transmitted can also be reduced.

DETAILED DESCRIPTION

Hereinafter, a hydraulic transmission assembly according to embodiments of the present disclosure will be described in detail with reference to the accompanying drawings.

Figure 2:
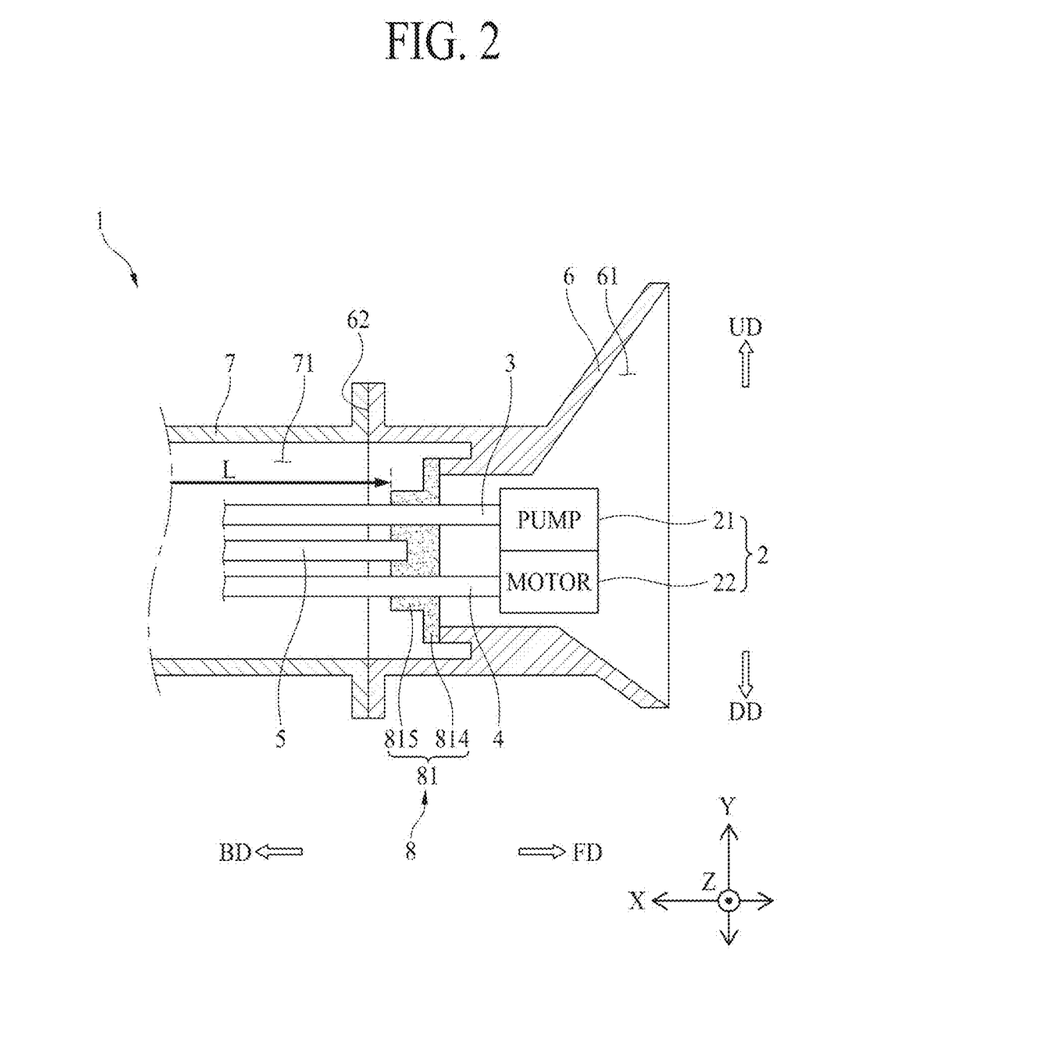
FIG. 2 is a partial schematic cross-sectional view illustrating a hydraulic transmission assembly according to the present disclosure.
Figure 3:
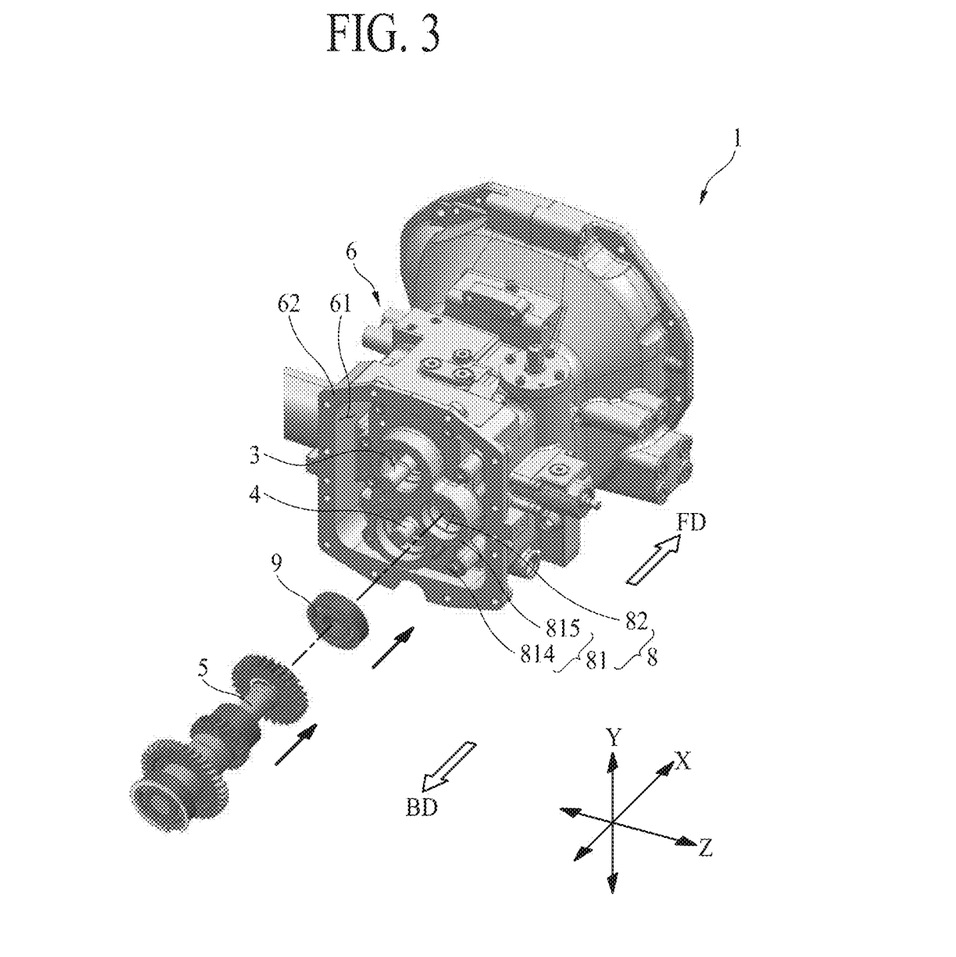
FIG. 3 is a schematic perspective view illustrating a state of the hydraulic transmission assembly according to the present disclosure before a sub-speed-shift shaft bearing and a sub-speed-shift shaft are coupled to a cover part.
Figure 4:
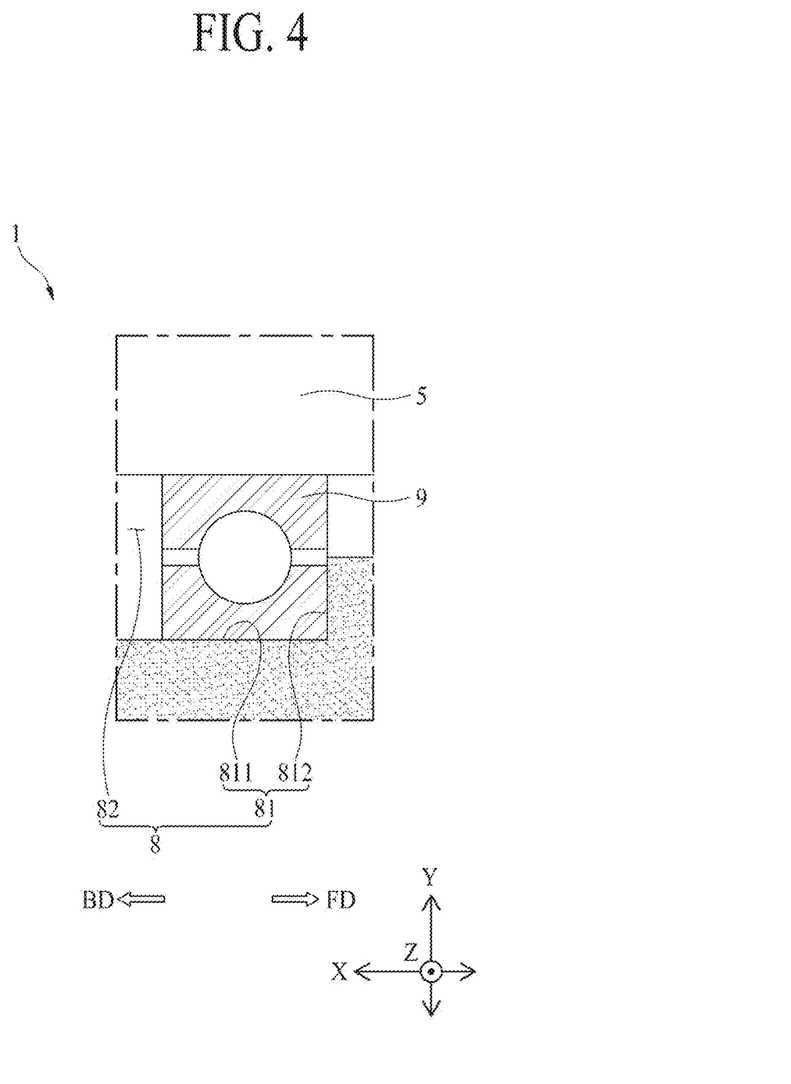
FIG. 4 is a partial schematic cross-sectional view illustrating a state in which a vertical restriction surface and a front restriction surface support the sub-speed-shift shaft bearing in the hydraulic transmission assembly according to the present disclosure.

Referring to FIGS. 2 to 4, a hydraulic transmission assembly 1 according to the present disclosure is installed in an agricultural working vehicle such as a tractor, a combine, and the like. The hydraulic transmission assembly 1 according to the present disclosure may be used to adjust a travel speed of a vehicle body (not shown). The vehicle body functions as a main body of the agricultural working vehicle. The hydraulic transmission assembly 1 according to the present disclosure may receive power from an engine (not shown) installed in the vehicle body, perform speed-shift work, and transmit power to a wheel (not shown) used for travel of the vehicle body, a working apparatus (not shown) for performing agricultural work, or the like.

To this end, the hydraulic transmission assembly 1 according to the present disclosure may include a hydraulic transmission 2 configured to perform speed-shift with respect to power generated by the engine using a pump 21 and a motor 22, a pump shaft 3 connected to the pump 21 and rotated by power transmitted from the pump 21, a motor shaft 4 connected to the motor 22 and rotated by power transmitted from the motor 22, a sub-speed-shift shaft 5 connected to at least one of the pump shaft 3 and the motor shaft 4 through a plurality of speed-shift gears, a mounting main body 6 in which a mounting space 61 is formed to install the hydraulic transmission 2, a speed-shift case 7 in which an accommodation space 71 is formed to accommodate the sub-speed-shift shaft 5 and which is connected to the mounting main body 6, and a cover part 8 coupled to the mounting main body 6.

The cover part 8 may be coupled to the mounting main body 6 such that at least a portion thereof is accommodated in the mounting space 61 and may provide support power to one side of the sub-speed-shift shaft 5. Accordingly, the hydraulic transmission assembly 1 according to the present disclosure may achieve the following effects.

First, in the hydraulic transmission assembly 1 according to the present disclosure, since one side of the sub-speed-shift shaft 5 is formed to be supported by the cover part 8, even when a support partition wall is not additionally provided between the mounting main body 6 and the speed-shift case 7, the sub-speed-shift shaft 5 may be supported. Accordingly, in the hydraulic transmission assembly 1 according to the present disclosure, a structure for supporting the sub-speed-shift shaft 5 is simply implemented when compared to a conventional art in which the support partition wall is disposed between the mounting main body 6 and the speed-shift case 7. Accordingly, the hydraulic transmission assembly 1 according to the present disclosure allows the number of total assembly processes to be decreased so that an assembly cost and an assembly time may be reduced and maintenance work such as replacement and repair may be further facilitated.

Second, in the hydraulic transmission assembly 1 according to the present disclosure, since the cover part 8 is coupled to the mounting main body 6 such that at least a portion thereof is accommodated in the mounting space 61, a length of the hydraulic transmission assembly 1 may be decreased in forward and backward directions (X-axis direction). The forward and backward directions (X-axis direction) are directions parallel to the forward direction (arrow direction FD) from the speed-shift case 7 to the mounting main body 6 and the backward direction (arrow direction BD) from the mounting main body 6 to the speed-shift case 7. Accordingly, in a case in which the hydraulic transmission assembly 1 according to the present disclosure is installed in the vehicle body, since a volume thereof is decreased in the forward and backward directions (X-axis direction), spatial utilization of the vehicle body is improved, and thus, a length of an entire power transmission passage through which power is transmitted from the hydraulic transmission 2 is decreased so that a degree of loss occurring while the power is transmitted may also be reduced.

Hereinafter, the hydraulic transmission 2, the pump shaft 3, the motor shaft 4, the sub-speed-shift shaft 5, the mounting main body 6, the speed-shift case 7, and the cover part 8 will be specifically described with reference to the accompanying drawings.

Referring to FIGS. 2 to 4, the hydraulic transmission 2 is used to adjust a torque, a speed, and the like as necessary while the vehicle body travels or the working apparatus works. The hydraulic transmission 2 may adjust a torque, a speed, and the like generated by power provided from a power source such as the engine to perform speed-shift work for the vehicle body. In order for the hydraulic transmission 2 to be operated, a working fluid such as oil is injected into the hydraulic transmission 2. The hydraulic transmission 2 may perform speed-shift by adjusting the power generated by the engine using the pump 21 and the motor 22. The pump 21 may adjust a hydraulic pressure of the working fluid using an inclined plate and the like, and the motor 22 may be operated using the hydraulic pressure of the working fluid transmitted from the pump 21. The hydraulic transmission 2 may be implemented as a hydrostatic transmission (HST).

Referring to FIGS. 2 and 3, the pump shaft 3 is connected to the pump 21. The pump shaft 3 may be rotated by power transmitted from the pump 21. A plurality of speed-shift gears may be installed around the pump shaft 3. The speed-shift gears installed around the pump shaft 3 may be rotated with the pump shaft 3 according to the rotation of the pump shaft 3. The pump shaft 3 may be accommodated in each of the mounting space 61 and the accommodation space 71. In this case, the speed-shift gears installed around the pump shaft 3 may be accommodated in the mounting space 61 or the accommodation space 71. The pump shaft 3 may be supported by the cover part 8. The pump shaft 3 may be formed to extend in the forward and backward directions (X-axis direction).

The hydraulic transmission assembly 1 according to the present disclosure may include a pump shaft bearing (not shown).

The pump shaft bearing is installed around the pump shaft 3. The pump shaft bearing may decrease rotational friction of the pump shaft 3. The pump shaft bearing may be implemented as a ball bearing, ring bearing, or the like and may be installed around the pump shaft 3 to surround an outer surface of the pump shaft 3. Accordingly, the pump shaft 3 may be installed in the cover part 8 through the pump shaft bearing supported by the cover part 8. The cover part 8 may support the pump shaft bearing into which the pump shaft 3 is inserted to provide support power to the pump shaft 3.

Referring to FIGS. 2 and 3, the motor shaft 4 is connected to the motor 22. The motor shaft 4 may be rotated by power transmitted from the motor 22. The plurality of speed-shift gears may be installed around the motor shaft 4. The speed-shift gears installed around the motor shaft 4 may be rotated with the motor shaft 4 according to the rotation of the motor shaft 4. The motor shaft 4 may be accommodated in each of the mounting space 61 and the accommodation space 71. In this case, the speed-shift gears installed around the motor shaft 4 may be accommodated in the mounting space 61 or the accommodation space 71. The motor shaft 4 may be supported by the cover part 8. The motor shaft 4 may be formed to extend in the forward and backward directions (X-axis direction).

Referring to FIGS. 2 and 3, the pump shaft 3 and the motor shaft 4 may be disposed to be spaced apart from each other in a vertical axis direction (Y-axis direction). The vertical axis direction (Y-axis direction) is a direction parallel to an upward direction (arrow direction UD) in which a height is increased and a downward direction (arrow direction DD) in which a height is decreased.

Accordingly, the hydraulic transmission assembly 1 according to the present disclosure is implemented such that a volume of the pump shaft 3 and the motor shaft 4 is decreased in a lateral direction (Z-axis direction) when compared to a structure in which the pump shaft 3 and the motor shaft 4 are disposed to be spaced apart from each other in the lateral direction (Z-axis direction) parallel to the vertical axis direction (Y-axis direction). Accordingly, in a case in which the hydraulic transmission assembly 1 according to the present disclosure is installed in the vehicle body, since a volume thereof is decreased in the lateral direction (Z-axis direction), spatial utilization of the vehicle body is improved, and interference thereof with fixtures such as pedal links and hydraulic pressure lines and structures may also be decreased.

Referring to FIGS. 2 and 3, the pump shaft 3 may be disposed in the upward direction (arrow direction UD) with respect to the motor shaft 4. In this case, the motor shaft 4 may be disposed in the downward direction (arrow direction DD) with respect to the pump shaft 3. The pump shaft 3 and the motor shaft 4 may be disposed to pass through the cover part 8. The pump shaft 3 and the motor shaft 4 may extend in the backward direction (arrow direction BD) from the hydraulic transmission 2.

The hydraulic transmission assembly 1 according to the present disclosure may include a motor shaft bearing (not shown).

The motor shaft bearing is installed around the motor shaft 4. The motor shaft bearing may decrease rotational friction of the motor shaft 4. The motor shaft bearing may be implemented as a ball bearing, ring bearing, or the like and installed around the motor shaft 4 to surround an outer surface of the motor shaft 4. Accordingly, the motor shaft 4 may be installed in the cover part 8 thorough the motor shaft bearing supported by the cover part 8. Since the cover part 8 supports the motor shaft bearing into which the motor shaft 4 is inserted, the cover part 8 may provide support power to the motor shaft 4.

Referring to FIGS. 2 and 4, the sub-speed-shift shaft 5 is connected to at least one of the pump shaft 3 and the motor shaft 4 through the plurality of speed-shift gears. In a case in which the sub-speed-shift shaft 5 is connected to at least one of the pump shaft 3 and the motor shaft 4, the sub-speed-shift shaft 5 may receive power from the connected shaft to be rotated. Since the sub-speed-shift shaft 5 is connected to at least one of the pump shaft 3 and the motor shaft 4, the sub-speed-shift shaft 5 may perform sub-speed-shift work through the plurality of speed-shift gears. The sub-speed-shift shaft 5 may be accommodated in the speed-shift case 7. One side of the sub-speed-shift shaft 5 may receive support power from the cover part 8.

Referring to FIGS. 2 and 3, the sub-speed-shift shaft 5 may be disposed between the pump shaft 3 and the motor shaft 4 in the vertical axis direction (Y-axis direction). The sub-speed-shift shaft 5 may be disposed at a position spaced apart from each of the pump shaft 3 and the motor shaft 4 in the lateral direction (Z-axis direction). The sub-speed-shift shaft 5, the pump shaft 3, and the motor shaft 4 may be disposed to have a cross section thereof having a triangular shape which is perpendicular to the forward and backward directions (X-axis direction). In this case, in the hydraulic transmission assembly 1 according to the present disclosure, since a volume of the sub-speed-shift shaft 5, the pump shaft 3, and the motor shaft 4 is further decreased in the vertical axis direction (Y-axis direction), the sub-speed-shift shaft 5, the pump shaft 3, and the motor shaft 4 may contribute to further improving spatial utilization in the vertical axis direction (Y-axis direction) when compared to a structure in which the sub-speed-shift shaft 5 is collinear with the pump shaft 3 and the motor shaft 4 in the vertical axis direction (Y-axis direction).

The sub-speed-shift shaft 5 may be directly engaged with at least one of the pump shaft 3 and the motor shaft 4 through the speed-shift gear according to manipulation of an operator or may be indirectly connected to at least one of the pump shaft 3 and the motor shaft 4 through another speed-shift gear (not shown). The sub-speed-shift shaft 5 may extend in the forward and backward directions (X-axis direction).

Referring to FIGS. 2 and 3, the mounting main body 6 is for the hydraulic transmission 2 to be installed therein. The mounting space 61 may be formed in the mounting main body 6. The mounting space 61 is for accommodating the hydraulic transmission 2 and may correspond to an inner space of the mounting main body 6. That is, the hydraulic transmission 2 is accommodated in the mounting space 61 so that the hydraulic transmission 2 may be installed in the mounting main body 6. The mounting main body 6 may function as a housing surrounding an exterior of the hydraulic transmission 2. The mounting main body 6 may serve to protect the hydraulic transmission 2 from an impact, vibration, or the like or to block foreign materials from being introduced into the hydraulic transmission 2.

Referring to FIGS. 2 to 5, the mounting main body 6 may include a coupling surface 62.

The coupling surface 62 is in contact with the speed-shift case 7 such that the mounting main body 6 is coupled to the speed-shift case 7. The coupling surface 62 may be a surface disposed at an outermost position in the mounting main body 6 in the backward direction (arrow direction BD). The coupling surface 62 may be one surface facing the backward direction (arrow direction BD). Accordingly, the mounting main body 6 may be coupled to the speed-shift case 7 through a bolt, a nut, and the like in a state in which the coupling surface 62 is in contact with the speed-shift case 7.

Referring to FIGS. 2 and 3, the speed-shift case 7 is for accommodating the sub-speed-shift shaft 5. The accommodation space 71 may be formed in the speed-shift case 7. The accommodation space 71 is for accommodating the sub-speed-shift shaft 5, the pump shaft 3, the motor shaft 4, and the speed-shift gears and may correspond to an inner space of the speed-shift case 7. That is, the sub-speed-shift shaft 5 is accommodated in the accommodation space 71 so that the sub-speed-shift shaft 5 may be installed in the speed-shift case 7. The speed-shift case 7 may function as a housing surrounding an exterior of the sub-speed-shift shaft 5, the pump shaft 3, the motor shaft 4, and the speed-shift gears. The speed-shift case 7 may serve to protect the speed-shift gears from an impact, vibration, or the like or to block foreign materials from being introduced between speed-shift gears from the outside.

Referring to FIGS. 2 and 4, the cover part 8 is coupled to the mounting main body 6. In a case in which the hydraulic transmission 2 is installed in the mounting space 61, the cover part 8 may be coupled to the mounting main body 6 to cover the hydraulic transmission 2. The cover part 8 may provide support power to one side of the sub-speed-shift shaft 5. Due to the support power provided by the cover part 8, the sub-speed-shift shaft 5 may not be inclined in the forward and backward directions (X-axis direction).

Accordingly, in the hydraulic transmission assembly 1 according to the present disclosure, since one side of the sub-speed-shift shaft 5 is supported by the cover part 8, even when a support partition wall is not additionally provided between the mounting main body 6 and the speed-shift case 7, the sub-speed-shift shaft 5 may be supported by only the cover part 8. Accordingly, in the hydraulic transmission assembly 1 according to the present disclosure, a structure for supporting the sub-speed-shift shaft 5 is simply implemented when compared to a structure in which the support partition wall is disposed between the mounting main body 6 and the speed-shift case 7. Accordingly, the hydraulic transmission assembly 1 according to the present disclosure allows the number of total assembly processes to be decreased so that an assembly cost and an assembly time may be reduced and maintenance work such as replacement and repair may be further facilitated.

Referring to FIGS. 2 and 4, the cover part 8 may be coupled to the mounting main body 6 such that at least a portion thereof is accommodated in the mounting space 61.

Accordingly, the cover part 8 may be coupled to the mounting main body 6 in a state in which the cover part 8 is further moved in the forward direction (arrow direction FD) when compared to a case in which the cover part 8 is not accommodated in the mounting space 61.

Accordingly, the length of the entire hydraulic transmission assembly 1 according to the present disclosure may be decreased in the forward and backward directions (X-axis direction) by an extent to which the cover part 8 is accommodated in the mounting space 61 in the forward and backward directions (X-axis direction). Accordingly, in a case in which the hydraulic transmission assembly 1 according to the present disclosure is installed in the vehicle body, an occupied volume therein in the forward and backward directions (X-axis direction) is decreased, spatial utilization of the vehicle body is improved, and thus, the length of the entire power transmission passage through which power is transmitted from the hydraulic transmission 2 is decreased so that a degree of loss occurring while the power is transmitted may also be reduced.

Referring to FIG. 2, the cover part 8 may be disposed in the forward direction (arrow direction FD) with respect to the coupling surface 62. In this case, the entire cover part 8 is accommodated in the mounting space 61. Since the cover part 8 is disposed in the forward direction (arrow direction FD) from the coupling surface 62, a separation distance thereof from the hydraulic transmission 2 may be decreased.

Figure 5:
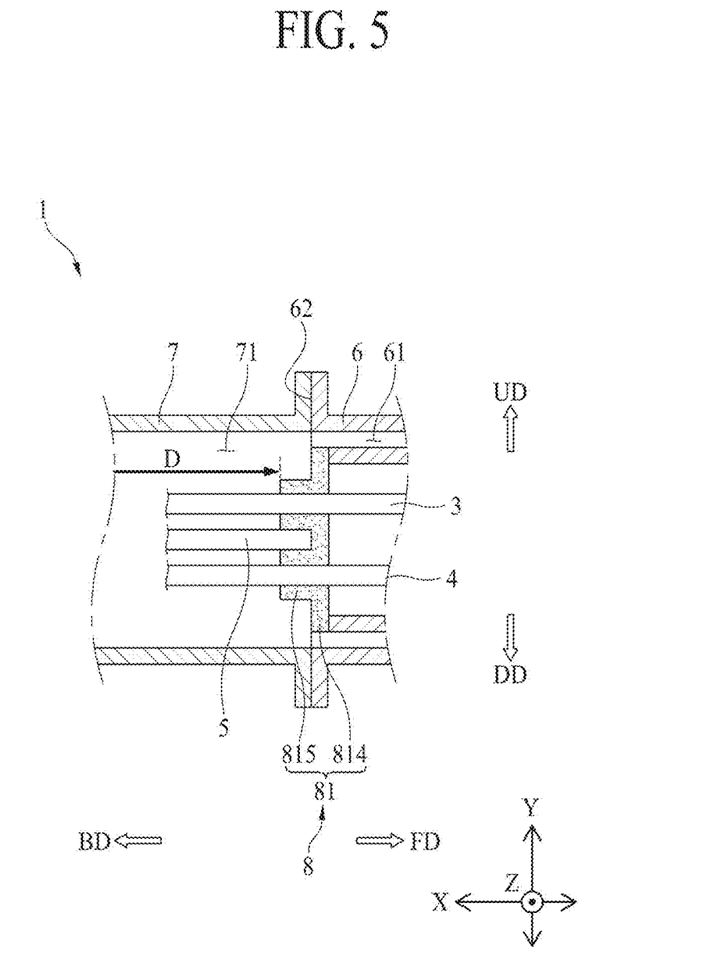
FIG. 5 is a partial schematic cross-sectional view illustrating a hydraulic transmission assembly according to another embodiment of the present disclosure in which a cover part is disposed behind a coupling surface.

Accordingly, in the hydraulic transmission assembly 1 according to the present disclosure, a length of the accommodation space 71 may be further increased in the forward and backward directions (X-axis direction) when compared to a structure in which the cover part 8 is disposed in the backward direction (arrow direction BD) with respect to the coupling surface 62 in a case in which a size of the speed-shift case 7 is the same. For example, as illustrated in FIG. 5, a length D of the accommodation space 71 in the forward and backward directions (X-axis direction) in another embodiment, in which the cover part 8 is disposed in the backward direction (arrow direction BD) with respect to the coupling surface 62, is less than a length L of the accommodation space 71 in the forward and backward directions (X-axis direction) according to the present disclosure. Accordingly, in the hydraulic transmission assembly 1 according to the present disclosure, since a volume of the entire accommodation space 71 is increased, the number of the speed-shift gears to be accommodated in the accommodation space 71 is increased so that speed-shift work for various speeds is performable, and a case in which the speed-shift gears unnecessarily collide with each other while relatively moving, such as engaging with or separating from each other, is prevented so that an operating life of the speed-shift gears may be further increased.

The cover part 8 may provide support power to the pump shaft 3 and the motor shaft 4. Since the pump shaft 3 and the motor shaft 4 are installed in the cover part 8, the pump shaft 3 and the motor shaft 4 may receive the support power from the cover part 8. The pump shaft 3 and the motor shaft 4 may be installed in the cover part 8 to pass through the cover part 8. Accordingly, the cover part 8 may perform a function of providing the support power to one side of the sub-speed-shift shaft 5 and also provide the support power to the pump shaft 3 and the motor shaft 4.

Referring to FIGS. 2 and 4, the cover part 8 may include a cover body 81 and an insertion groove 82.

The cover body 81 is coupled to the mounting main body 6. The cover body 81 may serve as a main body of the cover part 8. The insertion groove 82 is formed in the cover body 81 such that the sub-speed-shift shaft 5 is inserted into the insertion groove 82. The insertion groove 82 may be formed to pass through the cover body 81 or formed such that a portion of an outer surface of the cover body 81 is recessed. In a case in which the sub-speed-shift shaft 5 is inserted into the insertion groove 82, the cover body 81 may support a sub-speed-shift shaft bearing 9. The sub-speed-shift shaft bearing 9 is installed around the sub-speed-shift shaft 5 to reduce friction that occurs while the sub-speed-shift shaft 5 is rotated. The sub-speed-shift shaft bearing 9 may be formed as a ball bearing, ring bearing, or the like and installed around the sub-speed-shift shaft 5 to surround an outer surface of the sub-speed-shift shaft 5. Accordingly, the sub-speed-shift shaft 5 may be installed in the cover body 81 through the sub-speed-shift shaft bearing 9 inserted into the insertion groove 82. Since the cover body 81 supports the sub-speed-shift shaft bearing 9 inserted into the insertion groove 82, the cover body 81 may provide support power to the sub-speed-shift shaft 5.

Although not illustrated in the drawings, the cover body 81 may support at least one of the pump shaft bearing and the motor shaft bearing. Accordingly, the cover body 81 performs a function of supporting the sub-speed-shift shaft bearing and, simultaneously, may also perform a function of supporting at least one of the pump shaft bearing and the motor shaft bearing. Accordingly, the hydraulic transmission assembly 1 according to the present disclosure may be implemented to have a simple structure because the cover part 8 supports at least one of the pump shaft bearing and the motor shaft bearing even without an additional structure for supporting at least one of the pump shaft bearing and the motor shaft bearing.

Referring to FIG. 4, the cover body 81 may include a vertical restriction surface 811 and a front restriction surface 812.

The vertical restriction surface 811 restricts a movable distance of the sub-speed-shift shaft bearing 9 in a direction perpendicular to the forward and backward directions (X-axis direction). The vertical restriction surface 811 may support the sub-speed-shift shaft bearing 9 in the direction perpendicular to the forward and backward directions (X-axis direction).

Accordingly, the hydraulic transmission assembly 1 according to the present disclosure may restrict the sub-speed-shift shaft bearing 9 from being moved due to vibration and the like in the direction perpendicular to the forward and backward directions (X-axis direction) using the vertical restriction surface 811 while the sub-speed-shift shaft 5 is rotated. Accordingly, the hydraulic transmission assembly 1 according to the present disclosure may further improve stability of a function of supporting the sub-speed-shift shaft bearing 9 inserted into the insertion groove 82 and thus may contribute to improving stability in sub-speed-shift work performed by the speed-shift gears installed around the sub-speed-shift shaft 5.

The vertical restriction surface 811 may be one surface of the cover body 81 forming the insertion groove 82. The vertical restriction surface 811 may be formed to have a shape substantially the same as that of an outer surface of the sub-speed-shift shaft bearing 9 such that the sub-speed-shift shaft bearing 9 is tightly inserted into the insertion groove 82. For example, in a case in which the sub-speed-shift shaft bearing 9 is formed to have a ring shape to surround the outer surface of the sub-speed-shift shaft 5, the vertical restriction surface 811 may be formed to have a ring shape substantially the same as that of the outer surface of the sub-speed-shift shaft bearing 9.

The front restriction surface 812 restricts the movable distance of the sub-speed-shift shaft bearing 9 in the forward direction (arrow direction FD). In a case in which the sub-speed-shift shaft bearing 9 is inserted into the insertion groove 82, the front restriction surface 812 may be disposed in the forward direction (arrow direction FD) with respect to the sub-speed-shift shaft bearing 9.

Accordingly, the hydraulic transmission assembly 1 according to the present disclosure may restrict the sub-speed-shift shaft bearing 9 from being arbitrarily moved due to vibration and the like in the forward direction (arrow direction FD) using the front restriction surface 812 while the sub-speed-shift shaft 5 is rotated so as to prevent a case in which the sub-speed-shift shaft bearing 9 is decoupled from the insertion groove 82. Accordingly, the hydraulic transmission assembly 1 according to the present disclosure may further improve stability of a function of supporting the sub-speed-shift shaft bearing 9 inserted into the insertion groove 82 and thus may contribute to further improving stability in sub-speed-shift work performed by the speed-shift gears installed around the sub-speed-shift shaft 5.

The front restriction surface 812 may be one surface of the cover body 81 forming the insertion groove 82. The front restriction surface 812 may be formed to have a shape substantially the same as that of one surface, which faces the forward direction (arrow direction FD), of the sub-speed-shift shaft bearing 9 to increase an area supporting the sub-speed-shift shaft bearing 9. For example, in a case in which the sub-speed-shift shaft bearing 9 is formed to have a ring shape surrounding the outer surface of the sub-speed-shift shaft 5, the front restriction surface 812 may be formed to have a ring shape substantially the same as that of one surface, which faces the forward direction (arrow direction FD), of the sub-speed-shift shaft bearing 9.

The front restriction surface 812 may be formed to extend from the vertical restriction surface 811 in an inward direction toward the sub-speed-shift shaft 5. In a case in which the sub-speed-shift shaft 5 passes through the cover part 8, the front restriction surface 812 extends in the inward direction from the vertical restriction surface 811 so as not to reach the outer surface of the sub-speed-shift shaft 5. Accordingly, the front restriction surface 812 restricts the movable distance of the sub-speed-shift shaft bearing 9 in the forward direction (arrow direction FD) but does not interfere with rotation of the sub-speed-shift shaft 5.

Referring to FIGS. 2 and 3, the cover body 81 may include a coupling plate 814 and a support member 815.

The coupling plate 814 is to be coupled to the mounting main body 6. A length of the coupling plate 814 may be less than a length of the support member 815 in the forward and backward directions (X-axis direction).

Accordingly, the hydraulic transmission assembly 1 according to the present disclosure is implemented so that a length of a portion, which does not support the sub-speed-shift shaft bearing 9, of the cover body 81 is decreased in the forward and backward directions (X-axis direction). Accordingly, in the hydraulic transmission assembly 1 according to the present disclosure, a weight of the cover body 81 may be decreased when compared to a structure in which the length of the coupling plate 814 is equal to that of the support member 815 in the forward and backward directions (X-axis direction). Accordingly, in the hydraulic transmission assembly 1 according to the present disclosure, a manufacturing cost of the cover body 81 may be further reduced and a weight of the entire assembly installed in the vehicle body may be decreased, and thus energy efficiency of the vehicle body may be improved during traveling. The coupling plate 814 may be coupled to the mounting main body 6 using a coupling member such as a bolt and a nut.

The support member 815 is coupled to the coupling plate 814. The support member 815 may support the sub-speed-shift shaft bearing 9. The support member 815 may support the sub-speed-shift shaft bearing 9 to provide support power to the sub-speed-shift shaft 5. The support member 815 may be formed to protrude from the coupling plate 814 in the forward and backward directions (X-axis direction). For example, the support member 815 may be formed to protrude from the coupling plate 814 in the forward direction (arrow direction FD). The support member 815 may also be formed to protrude from the coupling plate 814 in the backward direction (arrow direction BD). In this case, an area of the vertical restriction surface 811 supporting the sub-speed-shift shaft bearing 9 may be increased in the forward and backward directions (X-axis direction).

Accordingly, the hydraulic transmission assembly 1 according to the present disclosure is implemented such that a relatively small thickness of the coupling plate 814 is maintained and the support power provided to the sub-speed-shift shaft 5 through the support member 815 in the forward and backward directions (X-axis direction) is increased. Accordingly, the hydraulic transmission assembly 1 according to the present disclosure may allow the stability of a support function of the cover part 8 supporting the sub-speed-shift shaft 5 to be improved.

The support member 815 may also provide support power to the pump shaft 3 and the motor shaft 4. The insertion groove 82 may be formed in the support member 815. The support member 815 may be formed to protrude from the coupling plate 814 in the backward direction (arrow direction BD) and disposed in the forward direction (arrow direction FD) with respect to the coupling surface 62. The vertical restriction surface 811 and the front restriction surface 812 may be formed on the support member 815. The support member 815 and the coupling plate 814 may be integrally formed.

The above-described present disclosure is not limited to the above-described embodiments and the accompanying drawings, and it will be apparent to those skilled in the art that various substitutions, modifications, and changes are possible without departing from the technical spirit of the embodiment.

The invention claimed is:

1. A hydraulic transmission assembly comprising:
a hydraulic transmission configured to perform speed-shift with respect to power generated by an engine using a pump and a motor;
a pump shaft connected to the pump;
a motor shaft connected to the motor and rotated by power transmitted from the motor;
a sub-speed-shift shaft connected to at least one of the pump shaft and the motor shaft through a plurality of speed-shift gears;
a mounting main body in which a mounting space is formed to install the hydraulic transmission;
a speed-shift case in which an accommodation space is formed to accommodate the sub-speed-shift shaft and which is coupled to the mounting main body; and
a cover part coupled to the mounting main body to cover the hydraulic transmission installed in the mounting space,
wherein the cover part is coupled to the mounting main body so that at least a portion thereof is accommodated in the mounting space and provides support to one side of the sub-speed-shift shaft,
wherein the cover part comprises a cover body coupled to the mounting main body,
wherein the cover body comprises a coupling plate coupled to the mounting main body, and a support member which is coupled to the coupling plate and supports the sub-speed-shift shaft,
wherein the mounting main body comprises a coupling surface to be coupled to the speed-shift case,
wherein the support member is formed to protrude from the coupling plate in a backward direction, in which the mounting main body faces the speed-shift case,
wherein the support member is disposed in the backward direction with respect to the coupling surface so that the support member is inserted into the accommodation space.

2. The hydraulic transmission assembly of claim 1, wherein the pump shaft and the motor shaft are disposed to be spaced apart from each other in a vertical axis direction parallel to an upward direction in which a height of the hydraulic transmission assembly is increased and a downward direction in which the height thereof is decreased.

3. The hydraulic transmission assembly of claim 2, wherein the sub-speed-shift shaft is disposed between the pump shaft and the motor shaft in the vertical axis direction.

4. The hydraulic transmission assembly of claim 1, further comprising a sub-speed-shift shaft bearing installed around the sub-speed-shift shaft to reduce rotational friction of the sub-speed-shift shaft,
wherein the cover part comprises an insertion groove formed in the cover body such that the sub-speed-shift shaft is inserted thereto, and
the cover body supports the sub-speed-shift shaft bearing in a case in which the sub-speed-shift shaft is inserted into the insertion groove.

5. The hydraulic transmission assembly of claim 4, wherein the cover body comprises a vertical restriction surface which restricts a movable distance of the sub-speed-shift shaft bearing in a direction perpendicular to forward and backward directions.

6. The hydraulic transmission assembly of claim 4, wherein the cover body comprises a front restriction surface positioned in a forward direction with respect to the sub-speed-shift shaft bearing to restrict a movable distance of the sub-speed-shift shaft bearing in the forward direction in which the speed-shift case faces the mounting main body.

7. The hydraulic transmission assembly of claim 4, wherein the support member supports the sub-speed-shift shaft bearing.

8. The hydraulic transmission assembly of claim 1, further comprising at least one of a pump shaft bearing installed around the pump shaft to reduce rotational friction of the pump shaft and a motor shaft bearing installed around the motor shaft to reduce rotational friction of the motor shaft,
wherein the cover body provides support to the pump shaft and the motor shaft and is coupled to the mounting main body, and
the cover body supports at least one of the pump shaft bearing and the motor shaft bearing.

* * * * *